E. G. PERL.
TREE PROTECTOR BAND.
APPLICATION FILED AUG. 18, 1919.
1,345,690.
Patented July 6, 1920.
2 SHEETS—SHEET 1.
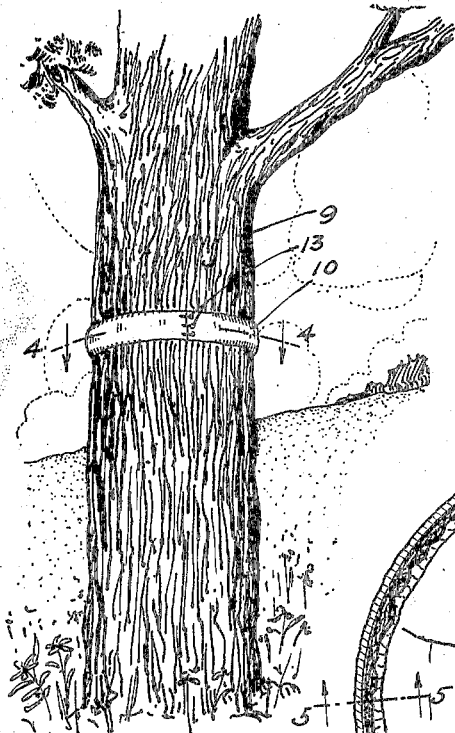
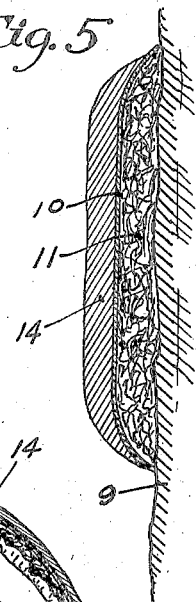
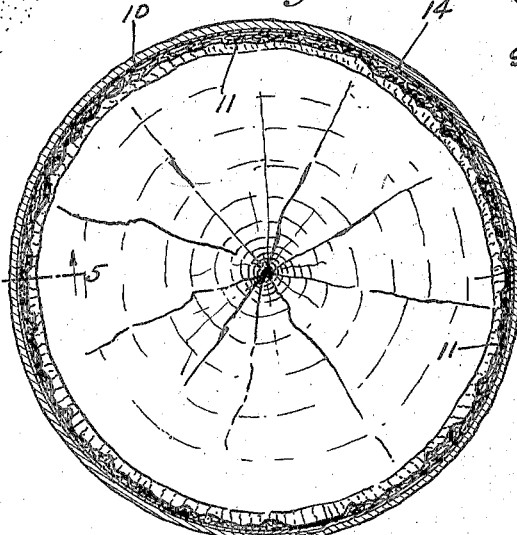
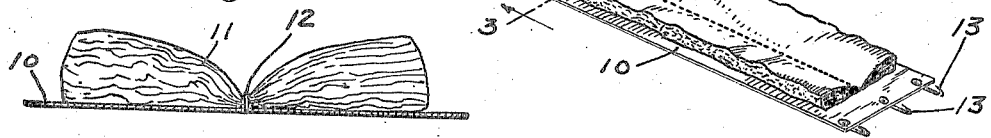
Inventor
Elmer Grant Perl
By his Attorneys

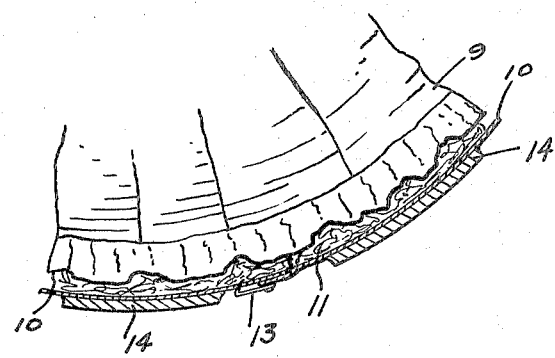
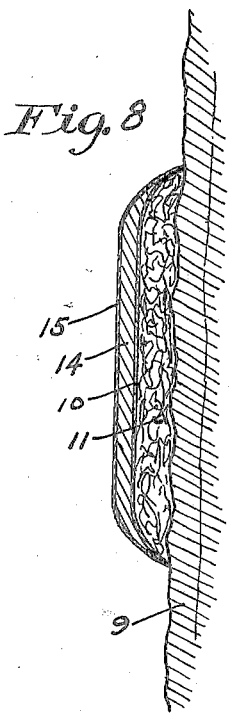
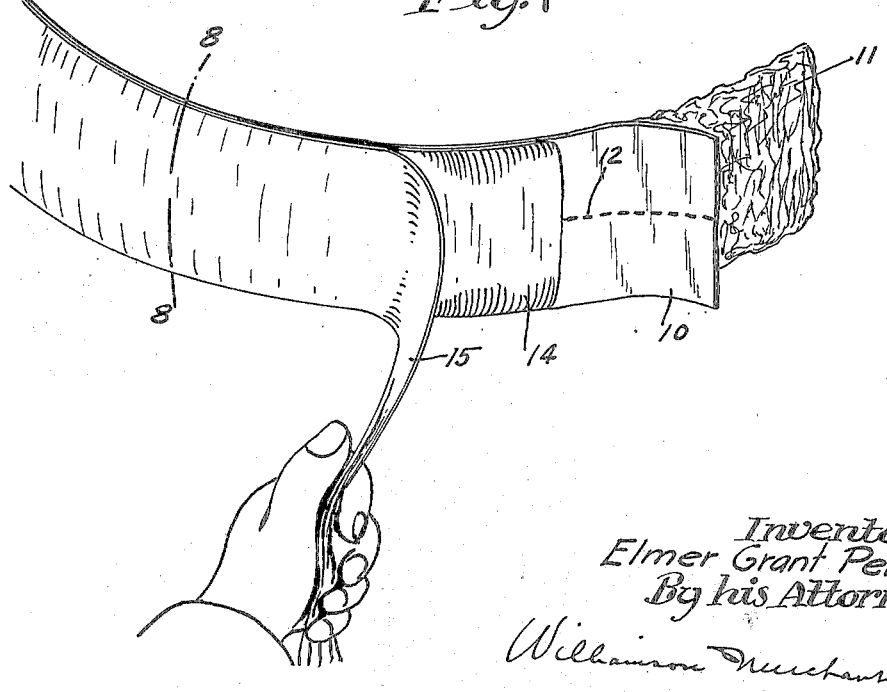

UNITED STATES PATENT OFFICE.

ELMER GRANT PERL, OF MINNEAPOLIS, MINNESOTA.

TREE-PROTECTOR BAND.

1,345,690.

Specification of Letters Patent.

Patented July 6, 1920.

Application filed August 18, 1919. Serial No. 318,070.

*To all whom it may concern:*

Be it known that I, ELMER GRANT PERL, a citizen of the United States, residing at Minneapolis, in the county of Hennepin and State of Minnesota, have invented certain new and useful Improvements in Tree-Protector Bands; and I do hereby declare the following to be a full, clear, and exact description of the invention, such as will enable others skilled in the art to which it appertains to make and use the same.

My invention relates to improvements in tree-protector bands, and has for its object to provide such a band that is extremely simple, of small cost to manufacture, and that can be easily applied to a tree or removed therefrom.

It is now the general practice to protect trees from various different insects by applying direct to a tree a girdle of sticky substance which is objectionable for the reason that it cannot be removed, and, when it decays, it is liable to cause the bark of the tree to decay. The direct application of a sticky substance to a smooth bark tree is liable to cause sun scald and, in applying the same to a rough bark tree, it is necessary to shave off the bark, which is highly objectionable for the reason that it permanently disfigures the tree.

By the use of my improved tree-protector band, the same may be applied to a tree and then taken off between the periods of ascension of various different kinds of insects.

To the above end, the invention consists of the novel devices and combinations of devices hereinafter described and defined in the claims.

In the accompanying drawings, which illustrate the invention, like characters indicate like parts throughout the several views.

Referring to the drawings:—

Figure 1 is a perspective view illustrating the improved band applied to a tree;

Fig. 2 is a perspective view of the inner face of the improved band laid out flat;

Fig. 3 is a transverse section taken on the line 3—3 of Fig. 2 on an enlarged scale;

Fig. 4 is a view in horizontal section taken on the line 4—4 of Fig. 1 on an enlarged scale;

Fig. 5 is a view in section taken on the line 5—5 of Fig. 4;

Fig. 6 is a fragmentary view corresponding to Fig. 4 but illustrating the connected ends of the band on a still further enlarged scale;

Fig. 7 is a fragmentary perspective view of the improved band having a protecting film applied to the sticky substance thereof; and Fig. 8 is a view in section taken on the line 8—8 of Fig. 7 on an enlarged scale.

The numeral 9 indicates a tree having the improved tree-protector band applied thereto, and which band comprises a flexible binding strip 10, of canvas or other suitable waterproof material, and a strip of cotton batting 11 applied to the inner face of said binding strip and attached thereto by a longitudinal center row of stitches 12. By reference to Fig. 3, it will be noted that the stitches 12 draw the longitudinal center of the cotton 11 onto the binding strip 10 and thereby cause the outer longitudinal edges of the cotton batting 11 to lift from the binding strip 10 and draw inward, which is important, as will presently appear. It is also important to note, by reference to Figs. 2 and 3, that the longitudinal edges of the binding strip 10 are extended outward of the longitudinal edges of the cotton batting 11 and that one of the ends of the binding strip 10 is extended beyond the adjacent end of the cotton batting 11 and has secured thereto a plurality of hooks 13.

In applying the improved band to a tree, it is important to cut the same of such length as to cause the ends of the cotton batting 11 to abut and form a tight joint but not overlap so as to permit insects to crawl thereunder. The binding strip 10 must be drawn around the tree with sufficient force to cause the cotton batting 11 to enter all of the crevices in the bark of the tree and close the same to prevent insects from crawling between the binding strip 10 and the tree. It will thus be seen that the raised outer longitudinal edges of the cotton batting 11 freely enter all of such crevices and close the same. After the band has thus been applied to a tree and before the pull thereon has been released, the hooks 13 are forced into the underlying body of the binding strip 10 to detachably connect the ends thereof.

In drawing the binding strip 10 around a tree, the outwardly extended longitudinal edges thereof will curve inward toward the tree and cover the exposed edges of the cotton batting 11, as best shown in Fig. 5. By thus covering the cotton batting 11, the band is given a neat and finished appearance and protects the cotton batting 11 from rain so that it will remain in a loose and fluffy condition and entangle any insect attempting to crawl between the binding strip 10 and the tree. Preferably, the binding strip 10 is formed from a fabric or other material having substantially the same general color as the bark of the tree so that the same blends therewith and is inconspicuous.

After the band has been secured to a tree, an application of any suitable sticky weatherable substance 14 is applied to the outer face of the binding strip 10, as shown in Fig. 5. Obviously, by releasing the hooks 13, the improved band may be readily removed from the tree and then re-applied at a later date.

The improved band, as shown in Figs. 7 and 8, has the sticky substance 14 applied thereto before the band is secured to the tree and said substance is temporarily protected by a film of suitable material 15 such as cambric. This film 15 must, of course, be peeled off to expose the sticky substance 14 after the band has been secured to a tree.

What I claim is:—

1. A tree-protector band comprising a flexible binding strip of waterproof fabric having cotton batting applied to one side thereof, the other side of the flexible binding strip being adapted to receive an application of sticky substance, the longitudinal edges of the flexible binding strip being extended outward of the longitudinal edges of the cotton batting so as to draw thereover and cover the same when said strip is applied to a tree.

2. A tree-protector band comprising a flexible binding strip of waterproof fabric having cotton batting applied to one side thereof, the other side of the flexible binding strip being adapted to receive an application of sticky substance, one end of the flexible binding strip being extended outward of the adjacent end of the cotton batting for overlapping engagement with the other of said ends, and a fastening device applied to the overlapped ends of said strip.

3. A tree-protector band comprising a flexible binding strip of waterproof fabric, cotton batting applied to one side thereof, said flexible binding strip and cotton batting being connected the one to the other at their longitudinal centers, the other side of the flexible binding strip being adapted to receive an application of sticky substance, the longitudinal edges of the flexible binding strip being extended outward of the longitudinal edges of the cotton batting so as to draw thereover and cover the same when said strip is applied to a tree.

4. A tree-protector band comprising a flexible binding strip having cotton batting attached to one side thereof, a sticky substance applied to the other side of the flexible binding strip, and a temporary protecting film applied to the sticky substance.

In testimony whereof I affix my signature in presence of two witnesses.

ELMER GRANT PERL.

Witnesses:
WINIFRED I. WARD,
HARRY D. KILGORE.